(No Model.)
G. L. FOWLER.
CAR BRAKE.
No. 424,773. Patented Apr. 1, 1890.
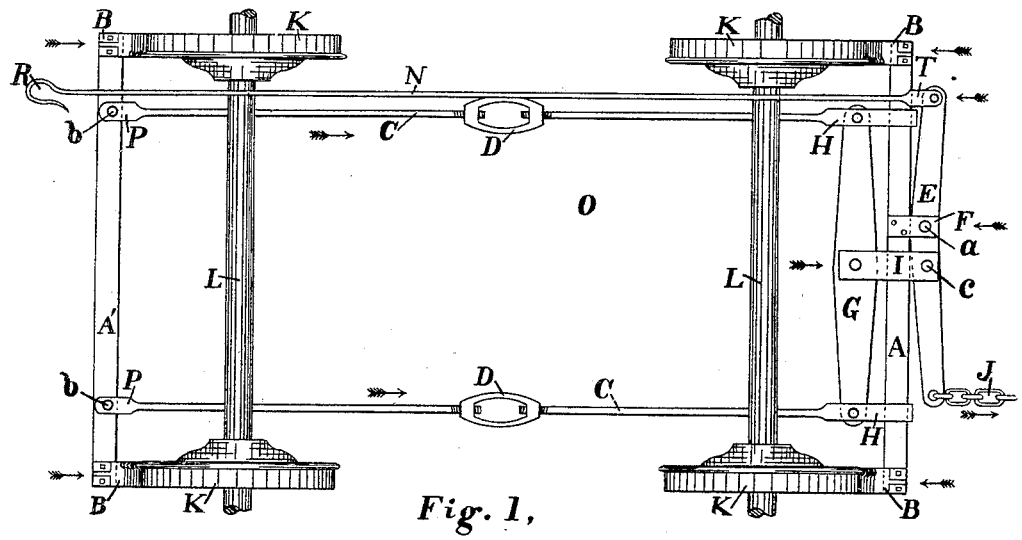
Fig. 1.
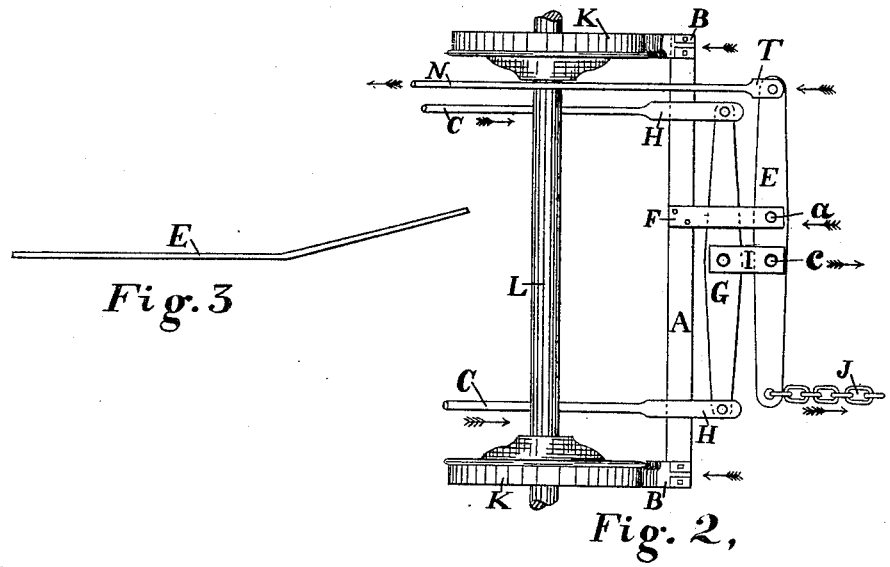
Fig. 3
Fig. 2.
WITNESSES
J. L. Preston
B. Fernow
INVENTOR
Geo. L. Fowler

UNITED STATES PATENT OFFICE.

GEORGE L. FOWLER, OF KINGSTON, NEW YORK.

CAR-BRAKE.

SPECIFICATION forming part of Letters Patent No. 424,773, dated April 1, 1890.

Application filed February 21, 1890. Serial No. 341,308. (No model.)

*To all whom it may concern:*

Be it known that I, GEORGE L. FOWLER, a citizen of the United States, residing at Kingston, in the county of Ulster and State of New York, have invented a new and useful Improvement in Car-Brakes; and I do hereby declare that the following is a full, clear, and exact description thereof, reference being had to the accompanying drawings, and to the letters of reference marked thereon, which form a part of this specification, in which—

Figure 1 is a plan view of my improved car-truck brake for four-wheeled trucks. Fig. 2 is a half-plan view of my improved car-truck brake, showing a modification due to a change in the position of the equalizing-lever G. Fig. 3 is a detail of the brake-lever E, showing the offset whereby the end of the lever may be raised above or lowered below the plane of the brake-beam A.

Similar letters refer to similar parts throughout the several views.

This invention is an improvement in brake mechanism for four-wheeled cars or trucks or to cars or trucks where the brakes are applied to four wheels under said car or truck, and its object is to apply the brakes to the car or truck wheels simultaneously from either end of the car.

To this end the invention consists in the novel construction and combination of parts, as hereinafter set forth and claimed.

Referring to the drawings, O designates the car or truck, the frame or body of which can be made in any suitable manner.

L L designate the axles, and K K K K the wheels.

A A' designate the brake-beams, lying transversely of the frame and exterior to the wheels, and being supported from the car-body or truck-frame in any suitable manner. (Not shown.)

B B B B designate the brake-shoes, bolted to the opposite ends of the beams A A' and adapted to bind against the peripheries of the wheels K K K K when the beams are moved inward. These shoes may be of any suitable shape or construction.

E designates the brake-lever at one end of the truck, and pivoted at $a$ to the projection F, extending outwardly from the brake-beam A. The end of the lever E to which the brake-chain J is attached may lie, preferably, in the same horizontal plane as its adjoining brake-beam A, to which it is connected. The lever E is also pivotally connected by the shackles or links I I to the transverse equalizing-bar G, as shown.

One end of the lever E is connected by a rod or chain J to the brake-operating shaft, (not shown,) by which a strain can be put upon the rod or chain and the brake operated. The opposite end of the lever E is likewise connected by a rod or chain N, preferably bifurcated, at T and hooked at R to the brake-operating shaft (not shown) which is located at the opposite end of the car from the brake-operating shaft to which the chain J is connected.

G designates the equalizing-bar, whereby the strain that is communicated to it through the links I is carried to the outer portion of the truck, and thence through the connecting-rods C C to the opposite end of the car or truck. The object of this is to convey the strain to the opposite end of the truck from that where the lever E is located, and at the same time leave the space in the center of the truck or car free for the operation of any mechanism that it may be found desirable to place there.

C C designate connecting-rods, each preferably, though not necessarily, made in two sections connected by turn-buckles D D for adjusting the length thereof. The ends of the said connecting-rods are horizontally bifurcated at the ends H H and embrace the equalizing-bar G, and may also be extended beyond the adjoining brake-beam A, thus serving to carry the weight of the ends of the equalizing-bar, Fig. 1, and hold them in position vertically. The connecting-rods are further connected pivotally or otherwise with the equilizing-bar G. The connecting-rods C C are further bifurcated at P P and embrace the brake-beam A', to which they are connected pivotally or otherwise at the points $b$ $b$. These rods lie at opposite sides of the truck at right angles to the brake-beams A A', and in whatsoever position may be found desirable with reference to the other component parts of the car or truck.

Whenever for any reason it is found to be desirable to place the equalizing-bar G outside the brake-beam A, as shown in Fig. 2, the bifurcations H H of the rods C C embrace the brake-beam A before reaching G. The action of the brake, however, remains unchanged.

In operation, if the brake-chain J be tightened the links I, and through them the equalizing-bar G, will be drawn outward. This movement through the connecting-rods C C draws the opposite brake-beam A′ inward and applies the brake-shoes to the wheels, and simultaneously as the end of the lever E where the chain J is attached is drawn outward it (the said lever) is fulcrumed at its point of attachment c to the links I, and its end opposite to that at which the brake-chain J is attached is moved, forcing the brake-beam A inward and applying the brake to the adjoining pair of wheels, as indicated by the arrows, Figs. 1 and 2. I am thus able to apply the brakes to the four wheels of the car or truck simultaneously. A similar action takes place when the rod N is tightened by the brake-operating shaft to which it is connected. The end of the lever E to which it is attached is drawn inward, forcing the adjoining brake-beam A toward the wheels. This lever E is then fulcrumed at $a$ and its opposite end from that to which N is attached is thrown outward, drawing back or outward the equalizing-bar G, and thereby drawing the brake-beam A′ at the opposite end of the truck toward the wheels by means of the connecting-rods C C. Thus the brakes may be applied from either end of the car by tightening the chain J or rod N, respectively.

It will be observed that, while the connections between the equalizing-levers G and the operating-lever E form the fulcrum of the latter, the point $a$ of attachment of this operating-lever E to the brake-beam A forms the fulcrum by which the power for applying the opposite set of brakes is derived.

When the brake-chain J or rod N is released, the brake-beams may be thrown back from the wheels by any suitably-arranged springs. (Not shown).

Having thus described my invention, what I claim as new is—

The combination, with a four-wheeled truck or car, of a pair of brake-beams, the brake-shoes thereon, the brake-lever pivotally connected with the brake-beam and equalizing-bar, the equalizing-bar, and a pair of rods connecting the equalizing-bar with the brake-beam at the opposite end of the truck, substantially as and for the purpose set forth.

GEO. L. FOWLER.

Witnesses:
J. L. PRESTON,
B. FERNOW.